United States Patent Office 3,470,079
Patented Sept. 30, 1969

3,470,079
HIGHLY RADIATION-SENSITIVE TELOMERIZED POLYAMIDES
Gaetano F. D'Alelio, South Bend, Ind., assignor to PPG Industries Inc., a corporation of Pennsylvania
No Drawing. Filed May 18, 1966, Ser. No. 550,968
Int. Cl. C08f 1/16
U.S. Cl. 204—159.15
24 Claims

ABSTRACT OF THE DISCLOSURE

The preparation of highly radiation-sensitive telomerized diacrylyl polyamides whereby said polyamides are treated by subjecting same to high energy ionizing radiation so as to produce three-dimensional crosslinked, insoluble infusible polymers at relatively low doses of ionizing radiation.

---

This invention in general deals with radiation-sensitive polymers. Particularly it concerns viscous, or solid soluble, fusible, relatively low molecular weight polymers, known as oligomers, which, when subjected to ionizing radiation become insoluble and infusible. More specifically, it deals with telomerized polyamides which, on irradiation, convert to three-dimensional crosslinked, insoluble, infusible polymers at relatively low doses of ionizing radiation.

The telomerized polyamides of this invention are linear polyamides which are derived either from the condensation of aminocarboxylic acids or from the condensation of saturated aliphatic, including cycloaliphatic, polycarboxylic acids with saturated aliphatic, including cycloaliphatic, polyamines or amino alcohols, whose end groups are capped by the highly radiation-sensitive acrylyl group,

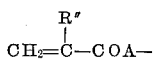

wherein R″ is hydrogen or CH₃, and A is either O or NH.

The term "polyamides" is used generically in this application to include amide-ester copolymers as well as polymers in which all the condensation groups are amide groups.

One group of the telomerized polyamides of this invention can be represented by the general formula

wherein A represents O or NH but at least one A per molecule represents NH and preferably at least 50% of the A groups represent NH; R represents a single valence bond connecting the two adjacent carboxylic radicals or a divalent saturated aliphatic (including cycloaliphatic) hydrocarbon radical of 1–10 carbon atoms; R′ is a divalent saturated aliphatic (or cycloaliphatic) hydrocarbon radical having 2–10 carbon atoms; R″ is hydrogen or CH₃; and n is an integer having a value of 1–14.

The —AOCRCOA— radical of this formula can be defined as the dicarboxylic radical derived from a saturated aliphatic dicarboxylic acid, such as oxalic, malonic, succinic, glutaric, adipic, decanedioic acids, etc., by reaction with a diamine, an alkalonamine or a mixture of a glycol and a diamine, or a mixture of an alkanolamine and a diamine. These diamines, alkanolamines and glycols can be represented by the formulas NH₂R′NH₂, NH₂R′OH and HOR′OH respectively. While the —NH— group is preferred as the connecting amide group, it is considered equivalent for most purposes of this invention to use —NR′— with R′ as defined above. The corresponding alkylene imines, R‴CH—CHR‴, can, when available, also be used, wherein R‴ is H or an alkyl group containing 1–10 carbon atoms.

Telomerized polyamides with a greater number of repeating segments, and therefore of higher molecular weight than the simplest polyamides, are prepared by increasing the ratio of the n moles of dicarboxylic acid and the n+1 mole of diamine or aminoalcohol to the 2 moles of acrylic acid to maintain the molar ratio of diacid:diamine:acrylic at n:(n+1):2. Thus it may be seen that the simplest polyamide is obtained with one mole of diacid; two moles of diamine, etc. and two moles of acrylic acid. When the value of n for the dicarboxylic acid is increased to 2, the value for the diamine becomes 3 and that for the acrylic function remains constant at 2.

Another group of the telomerized polyamides of this invention can be represented by the general formula

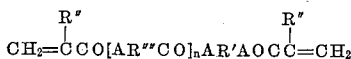

and

wherein A, R, R′, R″″ and n are as defined above; R″″ is a divalent aliphatic hydrocarbon radical of 4–10 carbon atoms preferably having at least 4 carbon atoms in the linear chain between its two valencies; and there are at least two —NH— groups in the polyamide represented by A.

The value of n or the number of repeating units within the bracket of the formula can be determined or controlled by various methods. For example, if caprolactam is used as the starting material the number of moles of caprolactam added per mole of water used to start the reaction will determine the value of n. For example, if three moles or five moles of caprolactam are used per mole of water, the value of n in the formula will be 3 or 5, respectively. If an amino acid is used, or an ester of the aminoacid, the vapors from the reaction can be condensed in an ice trap or in a Dean-Stark trap and the reaction contained until the theoretical amount of water or alcohol has been recovered to give the desired degree of polymerization.

Since the terminal groups in the aminoacid or caprolactam polymerization product differ from each other it is necessary to add a diamine, or an alkanolamine or a glycol to obtain a group reactive with the acrylyl agent, or to add a dibasic carboxylic acid or anhydride to convert the polymer to one having two terminal acid groups that can be reacted with beta-hydroxyethyl acrylate, etc.

The telomerized polyamides of this invention are particularly useful for blending with various types of polyamides, particularly those which are not easily crosslinked by radiation or which require such a high degree of radiation for crosslinking as to be accompanied by decomposition, degradation, or discoloration. Where the telomerized polyamide of this invention is blended with a polyamide substance such as a nylon or polycaprolactamide, the similarity in the structure of the polyamide of this invention with the structure of the polyamide to which it is being added facilitates the blending and makes it more compatible therewith, resulting in less destruction of or detraction from the properties of the original polymer. This permits a blending of a crosslinking agent of improved compatibility and permits subsequent crosslinking by radiation without any disruption of or detraction from the basic properties of the original polymer. Consequently the improvements effected by crosslinking are not offset in any manner by the presence of incompatible groups or groups which are less stable or have properties different from those of the amide groups of the base polymer.

In view of the fact that the radiation dosage previously required to effect any degree of crosslinking with most polymers was so high as to be accompanied by degradation of the polymer, particularly with nylon, it is particularly important that blending with the telomerized polyamides of this invention permits crosslinking of nylon and other aliphatic polymers to be effected at very low radiation dosages, as described more fully hereinafter, and thereby avoid degradation of the polymer.

While the telomerized polyamides of this invention have a particular utility with polyamide resins such as nylon and polycaprolactamide, they can be used with various other types of polymers, such as polyesters, both saturated and unsaturated, including maleic-ethylene glycol, phthalic-ethylene glycol, polyvinyl acetate, methylmethacrylate, polyvinyl chloride types, etc.

Where these telomerized polyamides are to be used with polyester types of resins, it is often desirable that the mixed amide-ester type of crosslinking agents of this invention be used. Likewise, when mixtures of polyamide and polyester resins are being blended for subsequent radiation, it is desirable to use the mixed type of amide-esters of this invention.

In preparing the mixed amide-ester types of copolymers of this invention, the reagents containing the amine and hydroxy groups can be reacted in practically any order or can be reacted in the same mixture with the dicarboxylic acid, or with the corresponding acid anhydride or acid halide. Likewise hydroxy acids can be reacted with amino acids in preparing polyamides of the second generic formula given above. However, in view of the reactivity of amines with the unsaturation in acrylic acid, precautions should be taken, as pointed out hereinafter, to avoid or to minimize this side reaction.

This can be done in several ways, for example, by having the center portion of the polymer preformed with a hydroxy group at each end of the resultant center portion. This can then be reacted with acrylic or methacrylic acid to complete the preparation of the telomerized polymeric amide-ester. In such cases, the initial reaction can be between a diamine and a dicarboxylic acid, using sufficient excess of the acid so that the terminal groups are free acid radicals. Then either a glycol or an alkanolamine can be added to react with these residual acid groups, thereby leaving a free hydroxy group at each end of the polymeric molecule, for subsequent reaction with the acrylic or methacrylic acid.

In the amino acid type of polyamide, a final reaction can be conducted with an hydroxy acid to place a hydroxy group at this end instead of the amine group, and a glycol can then be reacted with the acid radical at the other end of the molecule to place a hydroxy group there. In this way there will be hydroxy radicals at both ends of the molecule available for reaction with the acrylic acid.

In other cases, particularly where it is desirable to have only amide linkages in the polymer, the center portion can be made entirely by the reaction of a diamine with a dicarboxylic acid resulting in terminal free amine groups. Then the preparation can be completed by using acrylyl or methacrylyl halide for the acrylamide formation. Since the acrylyl halide has such a great affinity for the amine group, this eliminates almost instantaneously the availability of the amine groups for any reaction with the unsaturation in the acrylic compounds.

When such a halide is used, it is generally desirable to use a hydrogen halide-acceptor, such as a tertiary amine. It is also possible to use instead of the acrylyl halide a considerable excess of the stoichiometric amount of acrylic anhydride or methacrylic anhydride so that the amide reaction proceeds almost instantaneously and the acrylic acid formed as the byproduct is diluted in excess acrylic anhydride.

Typical syntheses of the telomerized polyamides or amide-esters of this invention are illustrated by the following reactions:

(1a) $nR(COOH)_2 + (n+1)R'(NH_2)_2 \rightarrow NH_2R'[NHOCRCONHR']_nNH_2$

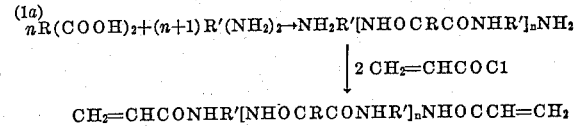

$CH_2=CHCONHR'[NHOCRCONHR']_nNHOCCH=CH_2$ (1b) $(n+1)R(COOH)_2 + nR'(NH_2)_2 \rightarrow HOOCR[CONHR'NHOCR]_nCOOH$

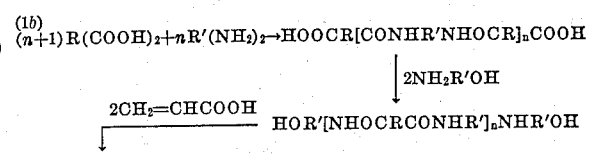

$2CH_2=CHCOOH \qquad HOR'[NHOCRCONHR']_nNHR'OH$ $CH_2=CHCOOR'[NHOCRCONHR']_nNHR'OOCCH=CH_2$ where A is used to represent —O— and —NH—, the formula of these compounds can also be given as:

$CH_2=CHCO[AR'AOCRCO]_{n+1}AR'AOCCH=CH_2$

Although the number of repeating units in the above formula is given as $n+1$ because it is derived from the preceding formula, this number of repeating units can also be represented by $n$.

(1c) $(n+1)R(COOH)_2 + nR'(NH_2)_2 \rightarrow HOOCR[CONHR'NHOCR]_nCOOH$

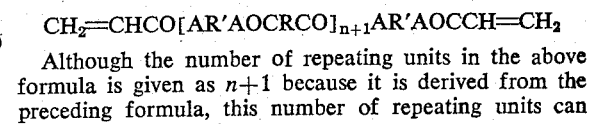

$HOR'OOCR[CONHR'NHOCR]_nCOOR'OH$ $\Big| 2CH_2=CHCOOH$ $CH_2=CHCOOR'OOCR[CONHR'NHOCR]_nCOOR'OOCCH=CH_2$

This can also be represented as:

$CH_2=CHCO[AR'AOCRCOA]_{n+1}R'AOCCH=CH_2$ (1d) $(n+1)R(COOH)_2 + nR'(OH)_2 \rightarrow HOOCR[COOR'OOCR]_nCOOH$

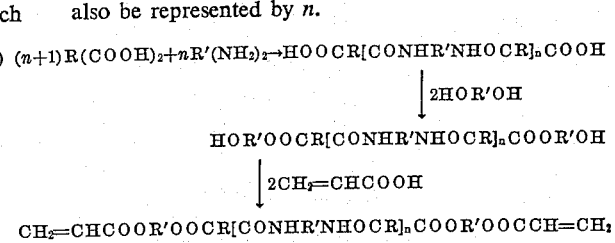

$NH_2R'NHOCR[COOR'OOCR]_nCONHR'NH_2$

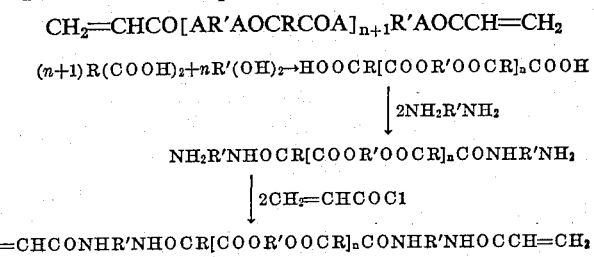

$CH_2=CHCONHR'NHOCR[COOR'OOCR]_nCONHR'NHOCCH=CH_2$

This can also be represented as:

(1e)   CH₂=CHCO[AR'AOCRCOA]ₙ₊₁R'AOCCH=CH₂

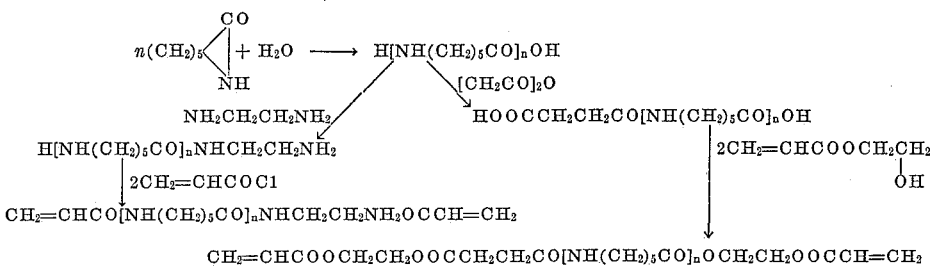

(1f)  $nNH_2(CH_2)_8COOH \xrightarrow{-(n-1)H_2O} H[NH(CH_2)_8CO]_{n-1}OH$

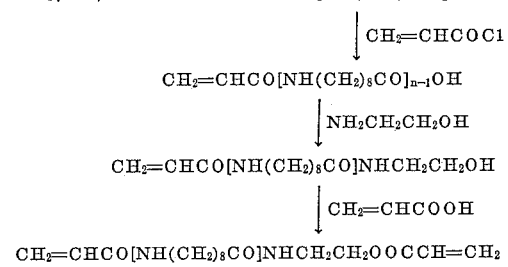

CH₂=CHCO[NH(CH₂)₈CO]NHCH₂CH₂OOCCH=CH₂

Typical examples of various alkanolamines that can be used in synthesizing the telomerized polyamides of this invention are: ethanolamines, propanolamines, butanolamines, hexanolamines, decanolamines, etc., such as 2-aminoethanol, 2-aminopropanol-1, 3-aminopropanol-1, 3-aminopropanol-2, 4-aminobutanol-1, 3-aminobutenol-2, 4-aminopentanol-1, 6-aminohexanol-1, 7-aminooctanol-2, 9-aminodecanol-2, 10-aminodecanol-1, etc.

Typical glycols that can be used in making mixed amide-ester polyamides include: ethylene glycol, trimethylene glycol, tetramethylene glycol, 2,3-dihydroxy-butane, hexamethylene glycol, decamethylene glycol, 2,2-diethyl-propane-diol-1,3, diethylene glycol, triethylene glycol, dipropylene glycol, 2-ethylhexanediol-1,3, etc.

Typical examples of the various HOOC—R—COOH acids that can be used in preparing the telomerized polyamides of this invention are oxalic, malonic, succinic, adipic, glutaric, sebacic, 2-methyl succinic, pimelic, 2,3-dimethyl succinic, suberic, hexyl succinic, 1,2-hexahydrophthalic, 1,3-hexahydrophthalic, 1,4-hexahydrophthalic, azelaic, 1,1-cyclobutanedicarboxylic, trans-1,4-cyclohexane-dicarboxylic, 3,3-diethyl glutaric, 3,3-dimethyl glutaric, 2,2-dimethyl glutaric, 2,2-dimethyl succinic, 2-ketoglutaric, diglycollic acids, etc.

A particular type of polyamide resins for which the telomerized polyamides or diacrylyl polyamides of this invention are particularly useful in blending for radiation treatment can be represented as consisting essentially of a plurality of repeating units having one of the following formulas:

—R''''CONH— and

—R''''NHOCR''''CONH— wherein the R'''' groups are divalent saturated aliphatic hydrocarbon radicals of 4–8 carbon atoms and advantageously having at least 4 carbon atoms in the linear chain of the repeating unit. The formula —RCONH— represents a polyamide repeating unit derived from an aminocarboxylic acid such as NH₂(CH₂)₆COOH or from caprolactam. The second of the above formulas represents polyamide repeating units in polyamides derived from the reaction of aliphatic diamines with aliphatic dicarboxylic acids, such as hexamethylene diamine and adipic acid which are used in the preparation of nylon 66, which is polyhexamethylene adipamide. These polyamides can have molecular weights of 500 or more for the purpose of this invention although there is no practical purpose in using polymers having molecular weights over 100,000.

A third preferred weight molecular weight range is 2000 to 50,000.

Depending on the nature of R, R' and R'' the viscosity of these telomerized polyamides increases from about 300 to 50,000 centistokes at 20° C. as the value of $n$ increases from 1–14. Also depending on the values of $n$, R' and R'', the molecular weight of these telomerized polyamides will vary from about 275 for the lowest one at a value of $n=1$ to about 8500 for $n$ equal to 14 when the diacid is decanedicarboxylic acid and the diamine glycol or aminoalcohol has 14 carbon atoms.

Typical examples of the various NH₂—R'—NH₂ diamines that can be used in synthesizing the telomerized polyamides of this invention are ethylene diamine, trimethylene diamine, tetramethylene diamine, 2,3-diaminobutane, 1,4-diaminobutane, 1,4-diamino-2-ethylbutane, 1,6-diaminohexane, 1,8-diaminooctane, 2,10-diaminodecane, 1,4-diaminocyclohexane, 1,4-bis(aminomethyl) cyclohexane, 1,3 - diaminocycloheptane, 2 - diethyl - propanediamine-1,3, 2,2-dimethyl-propanediamine-1,3, 3-methylpentanediamine-1,4, 2,2-diethylbutanediamine-1,3, 4,5-diaminononane, pentamethylenediamine, heptamethylenediamine, nonamethylenediamine, decamethylenediamine, diethylenetriamine, triethylenetetraamine, propylenediamine, dipropylenediamine, 2-ethylhexanediamine-1, 3, etc. Alkylene imines can also be used to give corresponding glycol derivatives, such as propylene imine ethylene imine, 2,3-butyleneimine, etc. While amines such as diethylene triamine, etc., have an intermediate amino group between the terminal amine groups, they are considered equivalent to the diamines listed above for the purpose of this invention.

It is most important to note that the various classes of telomerized polyamides used in the practice of this invention contain only saturated aliphatic hydrocarbon structures in the segments derived from the polycarboxylic acids and the polyamines, glycols and aminoalcohols. It is because of this aliphatic character that there telomerized polyamides are highly responsive to ionizing radiation, and in fact replacement of any of the aliphatic polycarboxylic acids by aromatic carboxylic acids or replacement of the aliphatic polyamines, etc. by aromatic amines, etc., decreases the response to ionizing irradiation to such a point that they are not economically feasible.

As an example, the dimethacrylyl telomerized polyethylene succinamides,

crosslink at about 3 megarads, whereas the corresponding phthalyl derivative,

and the corresponding xylyl derivative,

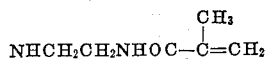

both require 16 and 20 megarads respectively, to become insoluble and infusible.

This difference is surprising particularly because these three telomerized polyamides all cure with radical initiators such as with 1% benzoyl peroxide in about 90-95 seconds at 100° C., and with redox systems of cobalt acetate and tertiary butyl hydroperoxide in three to three and one-half hours at room temperature. The difference is due apparently to the fact that aromatic ring compounds such as phenyl, naphthyl and the like are energy sinks for irradiation.

It will be noted too that the aliphatic hydrocarbon structures in the polycarboxylic and polyamide segments are saturated. This is for the purpose of avoiding brittleness and reducing susceptibility to oxidation and discoloration in the irradiated products. By having the unsaturation only at the ends of the telomerized diacryl polyamide more ductile products are obtained upon irradiation and resultant crosslinking, particularly where there are long saturated chains between the connecting acrylyl groups. Also by having only the acrylyl unsaturation in these compounds there is less residual unsaturation after irradiation and therefore less susceptibility to oxidation and discoloration.

The term "irradiation," as used herein, means high energy radiation and/or the secondary energies resulting from the conversion of this electron or other particle energy to neutron or gamma radiation, said energies being at least equivalent to about 100,000 volts. While various types of irradiation are suitable for this purpose, such as X-ray and gamma and beta rays, the radiation produced by accelerated high energy electrons has been found to be very conveniently and economically applicable and to give very satisfactory results. However, regardless of the type of irradiation and the type of equipment used for its generation or application, the use thereof in the practice of the invention as described herein is contemplated as falling within the scope of this invention so long as the ionization radiation is equivalent to about 100,000 electron volts.

While there is no upper limit to the electron energy that can be so applied advantageously, the effects desired in the practice of this invention can be accomplished without having to go above about 20,000,000 electron volts. Generally, the higher the electron energy used, the greater is the depth of penetration into the massive structure of the materials to be treated, and the shorter is the time of exposure required to accomplish the desired result. For other types of irradiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van de Graaff generators, betatrons, synchrotons, cyclotrons, etc. Neutron radiation can be produced by bombarding a selected light metal such as beryllium with positive particles of high energy. Particle radiations can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to radiations of this type, commonly called X-ray, an ionizing electromagnetic radiation suitable for the practice of this invention can be obtained by means of a nuclear reactor (pile) or by the use of natural or synthetic radioactive material, for example, cobalt 60.

Various types of high power electron linear accelerators are commercially available, for example, the Arco type travelling wave accelerator, model Mark I, operating at 3-10 million electron volts, such as supplied by High Voltage Engineering Corporation, Burlington, Mass., or other types of accelerators as described in United States Patent 2,763,609 and in British Patent 762,953 are satisfactory for the practice of this invention.

In the following examples, the radiation doses are reported in megarads, which represent 1,000,000 rads. A "rad" is defined as the unit of absorbed dose and is equal to 100 ergs per gram.

Many monomers as well as polymers have been subjected to ionizing radiation to convert them to improved or modified products. However, irradiation processes have been primarily of scientific interest, and very little use of such irradiation polymer processes has been made industrially. This is primarily due to economic factors because of the cost of the ionizing radiation delivered to the system to be treated. For example, the well-known low-cost polyester systems which coonsist of a mixture of about equal parts by weight of styrene monomer and unsaturated alkyd resin prepared from maleic or fumaric anhydride, phthalic anhydride and ethylene glycol or diethylene glycol can be more economically polymerized by free radical initiators than by ionizing radiation which requires about 25-40 megarads, depending on the formulation.

Such systems can be improved somewhat, however, by elimination of phthalic anhydride in the formulation of the polyester and substituting more expensive monomeric acrylic compounds for the styrene. Even in such systems, the economic factors are unfavorable not only because of the much higher cost of the mixture but because of the high volatility of the acrylic or methacrylic monomeric compounds used. Even in such cases the irradiation dose required is of the order of 18-20 megarads and the systems are highly inhibited by oxygen. The addition of substances such as acetone or methyl ethyl ketone can reduce the required dose to 9-12 megarads. Even then, the products possess the undesirable odor of unpolymerized acrylic monomer.

In contrast, by the use of the acrylyl telomerized polyamides of this invention, crosslinked, insoluble, infusible polymers can be prepared readily by subjecting the polyamides to ionizing radiation in doses of less than 8 megarads and in some cases to doses of 0.5 megarad or less, generally preferably at least about 1 megarad. Irradiation dosages in this range are economical.

Furthermore, the acrylyl components in these telomerized polyamides are located at the ends of the polyamide chains where they can be more effectively crosslink. More important, the acrylyl components can comprise a minor portion of the composition, and are particularly economical when the value of $n$ in these telomerized polyamides is at least 2. In addition, because the molecular weight of the telomerized polyamide is much higher than a corresponding simple monomer such as methyl methacrylamide or ethyl acrylamide it can function in a single molecule both as monomer and as polymer.

Even more surprising is the fact that this property of crosslinking at economical radiation doses is maintained when these telomerized polyamides are admixed wtih polyamide resins such as nylon, polycaprolactam, polyacrylamide, etc. alone or in the presence of other polymers provided the polyamide resin and the other polymers are of the non-aromatic type, that is, they are free of aromatic rings which act as energy sinks and retard the crosslinking reaction. One of the advantages of these diacrylyl polyamides is their compatibility with various types of resins, particularly polyamide types.

A few illustrative examples of suitable polymers which may be dissolved in or mixed with the telomerized polyamides of this invention along with the polyamide resins and other types of resin are the nonaromatic type polymers such as polyvinylacetamide, polyacrylamide, polymethyacrylamide, polyhexamethylene adipamide, polyethylene adipamide, polyethylene azelamide, polyethylenediacrylamide, polyvinyl acetate, polyethyl acrylate, polymethyl methacrylate, cellulose acetate, cellulose butyrate, ethyl cellulose, polyethylene adipate, polyethylene azeleate polydecamethylene succinate, polydecamethylene sebacate, etc. The lower telomerized polyamides are also compatible with polyvinyl chloride, particularly upon the application of moderate heat.

The telomerized polyamides of this invention are particularly useful as coating compositions on all types of substrates, including cellulose in its various forms, such as paper, wood, paper board, wood board, wood pulp, regenerated cellulose in film or fiber form, laminates of various types including those prepared from fibrous fillers bonded with urea, melamine, epoxy and polyester resins, plaster board, concrete in its various forms such as slabs, blocks and the like. They may also be used as impregnants for porous bodies such as the compositions hereinabove named, as well as for synthetic and natural sponges, etc. Particularly do they find use as bonding agents and adhesives for solid, porous and foamed bodies. They can be used alone or admixed with each other or with other copolymerizable monomers, unsaturated or saturated polymers, in the absence or presence of dyes, pigments, plasticizers. For coating, impregnating or adhesive compositions where the presence of small amounts of solvent in the cured composition is not objectionable they can be mixed with volatile or non-volatile solvents of a non-aromatic nature best suited to the particular application. The products resulting from the irradiation of the telomerized polyamides of this invention can vary from soft flexible bodies to hard rigid masses.

As previously stated, the telomerized radiation-sensitive polyamides of this invention are particularly useful in the preparation of copolymers with polyamide resins, such as nylons of the various types, polycaprolactam, polyacrylamide. In carrying this portion of the invention into effect, an amidification product of a polyamine and a polycarboxylic acid is first prepared in accordance with techniques now well known to those skilled in the polyamide art.

Any saturated aliphatic polyamine containing at least two amidifiable aliphatic amine groups, or mixtures of such amines, can be used in preparing the polyamide resins. Examples of such polyamines are ethylene diamine, diethylene triamine, triethylene tetraamine, 1,4-diaminobutene-2, bis(aminomethyl)cyclohexane, diaminocyclohexane, etc. Any non-aromatic polycarboxylic acid, or mixtures of such acids, can be reacted with the polyamine to form the polyamide resin. Examples of such polycarboxylic acids are succinic, adipic, glutaric, pimelic, sebacic, azelaic, suberic, tricarballylic, etc. Anhydrides of these acids, if available, can be used also. The term "polycarboxylic acid" as used generally herein is intended to include the anhydrides of the acids.

Aminoacids that can also be used in making polyamides suitable for the practice of this invention include the following saturated aliphatic aminoacids: 5-aminopentanoic acid, 6-aminohexanoic acid, 7-amnoheptanoic acid, 8-aminooctanoic acid, 10-aminodecanoic acid, etc.

The telomerized radiation-sensitive polyamides of this invention are also useful in the preparation of copolymers with unsaturated alkyd resins. In carrying this portion of the invention into effect, an esterification product of a polyhydric alcohol and an alpha,beta-unsaturated polycarboxylic acid is first prepared in accordance with techniques now well known to those skilled in the alkyd resin art.

Any aliphatic polyhydric alcohol containing at least two esterifiable aliphatic hydroxy groups, or mixtures of such alcohols, can be used in preparing the unsaturated alkyd resins. Examples of such polyhydric alcohols are ethylene glycol, di-, tri-, and tetraethylene glycols, thiodiglycol, glycerine, pentaerythritol, 1,4-dihydroxybutene-2, dimethylol cyclohexane, dihydroxycyclohexane, etc. Any nonaromatic alpha - unsaturated, alpha,beta - polycarboxylic acid, or mixtures of such acids, can be reacted with the polyhydric alcohol or alcohols to form the unsaturated alkyd resin. Examples of such polycarboxylic acids are maleic, fumaric, citraconic, mesaconic, acetylene dicarboxylic, aconitic, cyclohexene, dicarboxylic, etc., itaconic and its homologues, as, for instane, alpha-methyl itaconic acid, alpha,alpha-dimethyl itaconic acid, etc. Anhydrides of these polycarboxylic acids can also be employed.

In some cases, instead of using an unmodified, unsaturated alkyd resin, an unsaturated alkyd resin can be used which has been internally modified by replacing a part, say up to about 75 mole percent, of the unsaturated polycarboxylic acid with saturated aliphatic polycarboxylic acids, such as succinic, adipic, glutaric, pimelic, sebacic, azelaic, suberic, tricarballylic, etc.

The esterification products of polyhydric alcohols with ethylenic polycarboxylic acids, or with aliphatic polycarboxylic acids, can be further modified by introducing as a reactant in the preparation of the alkyd resin, a monoesterifiable compound or compounds, more particularly a saturated or unsaturated normal or isomeric monohydric alcohol, or mixture thereof, a saturated or unsaturated monocarboxylic acid, or mixture thereof, or both such esterifiable monohydroxy organic compounds as well as by the use of hydroacids.

Examples of nonaromatic monohydric alcohols which can be used as modifiers of the alkyd resin are propyl, isopropyl, butyl, isobutyl, amyl, isoamyl, hexyl, octyl, decyl, dodecyl, tetradecyl, cetyl, octadecyl, cyclohexyl, cyclopentyl, etc. The use of methyl and ethyl alcohol is not precluded, but in general these alcohols are less satisfactory because of their lower boiling points. As monobasic acids there can be used, for example, the unsubstituted saturated and unsaturated normal or isomeric monocarboxylic acids containing only one esterifiable group, such as acetic, propionic, butyric to stearic, inclusive, hexahydrotoluic, acrylic, methacrylic, furoic acids, etc.

The monoesterifiable compounds can be introduced into the esterification before, during, or after the esterification of the polyhydric alcohol with the polycarboxylic acid under conditions that promote interesterification of the monoesterifiable compound with the incompletely esterified polyhydric alcohol-polycarboxylic acid product. That is, the monoesterifiable compound is introduced into the reaction mass before all of the acid groups of the polyhydric acid, or all of the alcohol groups of the polyhydric alcohol have been esterified.

The term "unsaturated nonaromatic alkyd resins," as used generally herein and in the appended claims, is intended to include within its meaning both unmodified esterification products of a nonaromatic polyhydric alcohol with a nonaromatic alpha-unsaturated, alpha,beta-polycarboxylic acid and esterification products of these components which have been modified, for example, as briefly described hereinabove. An alternate term is "unsaturated aliphatic alkyd resins" (including cycloaliphatic types).

To achieve copolymerization of the unsaturated alkyd resin with the telomerized polyesters of this invention, a solution or mixture of the unsaturated alkyd resin in the telomerized polyesters is first effected. Copolymerization of the components of the mixture is achieved rapidly and advantageously by ionizing radiation, such as by atomic radiation from a reactor, or from cobalt 60, or by means of high energy electrons generated by an electron linear accelerator.

Typical examples of unsaturated alkyd resins are—

Alkyd resin A (ethylene glycol itaconate): Parts (by wt.)
  Ethylene glycol _____ 23
  Itaconic acid _____ 52

The components are mixed and slowly heated in the course of one hour from room temperature to 190° C., in an inert nitrogen atmosphere, and held at this temperature for three to five hours.

Alkyd resin B (ethylene glycol maleate): Parts (by wt.)
  Ethylene glycol _____ 31
  Maleic anhydride _____ 32

The compounds are mixed and heated as in the preparation of alkyd resin A to 190° C., and held at that temperature for four to six hours.

Alkyd resin C (acetic acid-modified
  diethylene glycol maleate): Parts (by wt.)
  Diethylene glycol _____ 106
  Maleic anhydride _____ 88
  Acetic anhydride _____ 10

The ingredients are mixed together and refluxed for one hour in an inert atmosphere of nitrogen after which the reaction mixture is brought to 190° C., which temperature is maintained for four to six hours.

It will be understood, of course, that this invention is not limited to the use of the specific unsaturated alkyd resins mentioned above and that a broad modification of the nature of the copolymer is possible by using other unsaturated aliphatic alkyd resins or mixtures of such resins. As illustrative examples of other unsaturated alkyd resins, the following esterification products can be used, as illustrated in alkyd resins D to I. Aromatic alkyd resin J is included for comparison.

Alkyd resin:           Components (parts)
  D _____ Diethylene glycol (160).
                   Maleic anhydride (147).
  E _____ Diethylene glycol (106).
                   Itaconic acid (130).
  F _____ Glycerine (18.4).
                   Itaconic acid (39.0).
  G _____ Ethylene glycol (610).
                   Maleic anhydride (19.6).
                   Hydroxypropyl acrylate (26.0).
  H _____ Ethylene glycol (20).
                   Maleic anhydride (29.4).
                   Succinic acid (3.3).
  I _____ Diethylene glycol (30.6).
                   Maleic anhydride (17.6).
                   Itaconic acid (15.6).
  J _____ Diethylene glycol (30.3).
                   Maleic anhydride (13.2).
                   Phthalic anhydride (21.7).

In many cases, instead of polymerizing a single telomerized polyamide with a single aliphatic polyamide resin or aliphatic unsaturated alkyd resin, mixtures can be used of two or more telomerized polyamides with a single polyamide resin or unsaturated aliphatic alkyd resin, or a single telomerized polyamide with two or more aliphatic resins, or a mixture of two or more telomerized polyamides with two or more aliphatic resins. In conjunction with the aliphatic resins, comonomers can be used which are copolymerizable with the telomerized polyamide or with the aliphatic resins, or with both, for example, one or more telomerized polyamides can be used with one or more aliphatic resins together with methyl methacrylate.

In addition to, or in lieu of the methyl methacrylate, other comonomers or mixture of comonomers can be used, for example, the vinyl esters, that is vinylacetate, and the vinyl esters of saturated and unsaturated, and aliphatic, monobasic and polybasic acids, and more specifically the vinyl esters of the following acids: propionic, isobutyric, valeric, caprylic, capric, oleic, stearic, acrylic, methacrylic, crotonic, oxalic malonic, succinic, glutaric, adipic, suberic, azelaic, maleic, fumaric, itaconic, mesaconic, hexahydrobenzoic, citric, trimesic, etc., as well as the corresponding allyl, methallyl, etc., esters of the aforementioned acids.

Other suitable comonomers are the acrylic and alkacrylic acids and their derivatives, such as their esters, amides and corresponding nitriles, for example, acrylic acid, methyl acrylate, butyl acrylate, allyl acrylate, ethylene glycol diacrylate, ethylene diacrylamide, propylene diacrylamide, acrylonitrile, methacrylonitrile, methacrylic acid, methyl methacrylate, hydroxypropyl methacrylate, etc.; the itaconic acid monoesters and diesters, such as the methyl, ethyl, allyl, dimethallyl, the maleic and fumaric acid monoesters, diesters and their amide and nitrile compounds, such as, ethyl allyl maleate, maleyl diamide, fumaryl dinitrile, dimethallyl fumarate, etc.; the ethers, such as methallyl allyl ether, vinyl allyl ether, vinyl methallyl ether, allyl crotyl ether, viny crotyl ether; cyanuric acid derivatives such as diallyl cyanurate, triallyl cyanurate, trivinyl cyanurate, or in general, triazine compounds having at least one polymerizable or copolymerizable unsaturated group attached directly or indirectly to the triazine ring, as well as the partial, soluble or fusible polymers of the hereinabove listed monomers, etc.

The modified aliphatic polyamide resins of this invention can be used alone or with fillers, dyes, pigments, opacifiers, lubricants, plasticizers, natural and synthetic resins or other modifying bodies in, for example, casting, molding, laminating, coating applications, and as adhesives, impregnants, and protective coatings.

In coating, impregnating and similar applications, the mixed monomeric or partially copolymerized materials, without added solvent can be applied to the object to be treated and polymerized, with or without the application of heat and pressure, to form the final insoluble polymeric composition in situ. These new synthetic materials can be used as impregnants for many porous bodies, such as cork, pottery, felts, or fabricated bodies with interstices, such as the windings of electrical coils, netted fibers, interwoven fibrous cotton or glass materials, etc. They can also be used for the production of wire coatings and winding tapes, and for protectively coating impervious articles, such as metals, or for coating and impregnating articles such as paper, wood, cloth, glass fibers in felted, woven or other form, concrete, linoleum, synthetic boards, etc. These new synthetic materials can also be employed in making laminated fibrous sheet materials wherein superimposed layers of cloth, paper, glass fabrics or mats, etc., are firmly bonded together with these new compositions. Also, these new mixtures comprising at least one telomerized polyamide of this invention and at least one aliphatic polyamide resin, with or without modifying agents, can be cast under pressure while being irradiated.

In preparing the interpolymerization products of the aliphatic polyamide resin and the telomerized polyamide, the aliphatic polyamide resin can constitute as much as 98 to 99 percent by weight of the whole. In other cases the telomerized polyamide alone, or admixed with aliphatic comonomers or modifiers, can constitute as much as 98 to 99 percent by weight of the whole.

In general, the proportions of the components used in a particular formulation will depend upon the particular properties desired in the interpolymer. For most applications, it is preferred to use 30 to 90 percent of the unsaturated aliphatic polyamide resin and from 10 to 70 percent of the telomerized polyamide, since within these ranges interpolymers best adapted for most commercial applications can be produced.

Within these ranges the new interpolymers have a wide range of properties. For example, depending upon the particular telomerized polyamide or mixture of telomerized polyamides used with the particular aliphatic polyamide resin the particular proportions thereof, the conditions of polymerization, such as the temperature, pressure, presence or absence of additives, etc., the irradiation dose, and the extent of polymerization, they can vary from soft flexible bodies to hard rigid masses of varying resistance to solvents.

In the intermediate stages of copolymerization, some form fluid compositions of varying viscosities and may be so used. For coating or impregnating applications where the presence of a small amount of solvent in the cured composition is not objectionable, the mixed starting component can be diluted with volatile or non-volatile solvents or diluents best suited for the particular service application, and then can be polymerized after the application of the solution to the particular article to be coated or impregnated, or impregnated and coated. By suitable selection of the starting material and the conditions of the interpolymerization, interpolymers can be obtained in an insoluble, infusible state practically resistant to the destructive effect of other chemical bodies, such as acid, bases, salts, solvents, swelling agents, and the like.

When it is desired to modify the properties of the polymers of the telomerized polyamides of this invention, this can be accomplished by copolymerizing a mixture comprising at least one telomerized polyamide with at least one copolymerizable unsaturated ethylenic, or acetylenic hydrocarbon radical, more particularly, a $CH_2=C<$ radical, such as vinyl, allyl, methallyl, vinylidene, etc., or with a copolymerizable compound containing a $-CH=CH-$, or a $-CH=C<$, or a $>C=C<$ grouping, for example, as in vinylidene fluoride, vinylidene cyanide, vinyl propionate, maleic anhydride, or its esters and amides, methyl maleic anhydride, tetrafluoroethylene, etc.

Additional examples of copolymerizable comonomers are monomeric or partially polymerized vinyl esters, such as the acetate, propionate, etc.; vinyl ketones, methvinyl ketones, olefinic nitriles, such as acrylonitrile, methacrylonitrile, fumaryl nitrile, beta-cyanoethyl acrylate, acrylic and methacrylic esters, for example, methyl acrylate, ethyl acrylate, propyl acrylate, butyl acrylate, ethyl methacrylate, propyl methacrylate, butyl methacrylate, octyl methacrylate, glycol dimethacrylate, allyl methacrylate, etc.; itaconic esters, for example, dimethyl itaconate, diethyl itaconate, diallyl itaconate; olefinic amides, for example, acrylamide, itaconamide, the maleic mono- and diamides, and the corresponding imides, etc., the vinyl ethers, for example, vinyl butyl ether, vinyl isobutyl ether, vinyl cyclohexyl ether, the dienes, etc., for example, butadiene, isoprene, dimethyl butadiene, etc.

In preparing copolymers of the telomerized polyesters with other polymerizable comonomers such as methyl methacrylate, acrylonitrile, and the like, the telomerized polyesters can constitute as little as 0.1 percent by weight of the whole, whereas in other cases, the telomerized polyamides alone can constitute as much as 98 to 99 percent of the whole. As in the case of the copolymers with aliphatic polyamide and polyester resins, the proportion of the components in a particular formulation will depend upon the particular comonomers used and the particular properties desired in the copolymer. The polymers and copolymers can be prepared most readily by ionizing radiation.

Various methods of practicing the invention are illustrated by the following examples. These examples are intended merely to illustrate the invention and not in any sense to limit the manner in which the invention can be practiced. The parts and percentages recited therein and all through this specification, unless specifically provided otherwise, refer to parts by weight and percentages by weight.

EXAMPLE I

In a suitable apparatus equipped with a stirrer, reflux condenser, inert gas inlet, heating mantle, and thermostatic control for the reactor, are placed 24 parts of ethylene diamine and 20 parts of succinic acid anhydride. The apparatus is first deoxygenated by sweeping dry deoxygenated nitrogen through the apparatus and thereafter allowing a slow stream of nitrogen to pass through the reaction. The mixture is heated to about 100° C. for thirty minutes to give a quantitative yield of $NH_2CH_2CH_2NHOCCH_2CH_2CONHCH_2CH_2NH_2$ Then 36.2 parts of acrylyl chloride, 0.25 part of hydroquinone and 1 part of tributyl amine are added, and the reaction continued for about thirty minutes. There is obtained the telomerized oligomer (a) $CH_2=CHCONHCH_2CH_2NHOCCH_2CH_2$
$CONHCH_2CH_2NHOCCH=CH_2$ which is a light-colored resinous product.

When an equivalent amount of acetyl chloride is substituted for the acrylyl chloride there is obtained a viscous product having the formula (b) $CH_3CONHCH_2CH_2NHOCCH_2CH_2$
$CONHCH_2CH_2NHOCCH_3$

EXAMPLE II

The procedure of Example I is repeated ten times using respectively instead of the 20 parts of succinic acid anhydride:

(a) 18.0 parts of oxalic acid;
(b) 20.8 parts of malonic acid;
(c) 22.8 parts of glutaric acid anhydride;
(d) 29.2 parts of adipic acid;
(e) 32.0 parts of pimelic acid;
(f) 37.6 parts of azelaic acid;
(g) 34.8 parts of suberic acid;
(h) 23.8 parts of methyl malonic acid;
(i) 40.4 parts of sebacic acid; and
(j) 47.5 parts of decanedioic acid;

and there are obtained respectively:

(a') $CH_2=CHCONHCH_2CH_2NHOCCONHCH_2$
$CH_2NHOCCH=CH_2$
(b') $CH_2=CHCONHCH_2CH_2NHOCCH_2$
$CONHCH_2CH_2NHOCCH=CH_2$
(c') $CH_2=CHCONHCH_2CH_2NHOC(CH_2)_3$
$CONHCH_2CH_2NHOCCH=CH_2$
(d') $CH_2=CHCONHCH_2CH_2NHOC(CH_2)_4$
$CONHCH_2CH_2NHOCCH=CH_2$
(e') $CH_2=CHCONHCH_2CH_2NHOC(CH_2)_5$
$CONHCH_2CH_2NHOCCH=CH_2$
(f') $CH_2=CHCONHCH_2CH_2NHOC(CH_2)_7$
$CONHCH_2CH_2NHOCCH=CH_2$
(g') $CH_2=CHCONHCH_2CH_2NHOC(CH_2)_6$
$CONHCH_2CH_2NHOCCH=CH_2$
(h') $CH_2=CHCONHCH_2CH_2NHOCCH(CH_3)$
$CONHCH_2CH_2NHOCCH=CH_2$
(i') $CH_2=CHCONHCH_2CH_2NHOC(CH_2)_8$
$CONHCH_2CH_2NHOCCH=CH_2$
(j') $CH_2=CHCONHCH_2CH_2NHOC(CH_2)_{10}$
$CONHCH_2CH_2NHOCCH=CH_2$

EXAMPLE III

The procedure of Example I is repeated six times using respectively instead of the 24 parts of ethylene diamine:

(a) 29.6 parts of trimethylenediamine;

(b) 57.6 parts of hexamethylene diamine;
(c) 68.8 parts of octamethylene diamine;
(d) 80.0 parts of 2,9-diaminodecane;
(e) 24.2 parts of ethanolamine;
(f) 35.6 parts of 4-amino-butanol-1;

and there are obtained respectively:

(a′) CH$_2$=CHCONH(CH$_2$)$_3$NHOCCH$_2$CH$_2$
           CONH(CH$_2$)$_3$NHOCCH=CH$_2$ (b′) CH$_2$=CHCONH(CH$_2$)$_6$NHOCCH$_2$CH$_2$
           CONH(CH$_2$)$_6$NHOCCH=CH$_2$ (c′) CH$_2$=CHCONH(CH$_2$)$_8$NHOCCH$_2$CH$_2$
           CONH(CH$_2$)$_8$NHOCCH=CH$_2$ (d′) 
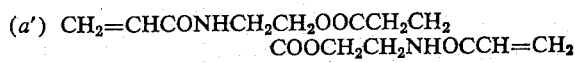

(e′) CH$_2$=CHCOOCH$_2$CH$_2$NHOCCH$_2$CH$_2$
           CONHCH$_2$CH$_2$OOCCH=CH$_2$ (f′) CH$_2$=CHCOO(CH$_2$)$_4$NHOCCH$_2$CH$_2$
           CONH(CH$_2$)$_4$OOCCH=CH$_2$

EXAMPLE IV

The procedure of Example I is repeated five times using in place of the ethylene diamine and the succinic anhydride respectively:

(a) 29.6 parts of trimethylene diamine and 22.8 parts of methyl succinic anhydride;
(b) 57.6 parts of hexamethylene diamine and 25.6 parts of dimethyl succinic anhydride;
(c) 35.2 parts of tetramethylene diamine and 30.8 parts of 1,2-hexahydrophthalic anhydride;
(d) 24.2 parts of ethanolamine and 30.8 parts of 1,4-hexahydrophthalic anhydride;
(e) 35.6 parts of 4-aminobutanol-1 and 29.2 parts of adipic acid;

and there are obtained respectively:

(a′) 

(b′) 

(c′) 

(d′) 

(e′) CH$_2$=CHCOO(CH$_2$)$_4$NHOC(CH$_2$)$_4$
           CONH(CH$_2$)$_2$OOCCH=CH$_2$

Where it is desired to have acrylamide as the terminal portion and the center portion an ester-type, this can be accomplished by reacting an acrylyl halide with an amino-alcohol, and subsequently reacting the resultant hydroxyamide with a dibasic acid or a polymeric ester having terminal acid groups. This is illustrated by the following example.

EXAMPLE V (a) In the apparatus of Example I and under the nitrogen atmosphere described therein, 36.2 parts of acrylyl chloride and 24.2 parts of ethanolamine are reacted in the presence of 1 part of tributyl amine and 0.25 part of hydroquinone with the temperature being gradually raised to 100° C. for about thirty minutes. The resultant product has the formula CH$_2$=CHCONHCH$_2$CH$_2$OH 

This is reacted with 20 parts of succinic acid anhydride for about four hours at 125° C. to give (a′) CH$_2$=CHCONHCH$_2$CH$_2$OOCCH$_2$CH$_2$
           COOCH$_2$CH$_2$NHOCCH=CH$_2$ (b) When the above beta-hydroxyethyl acrylamide product is reacted with a polymeric ester having terminal acid groups, instead of with the succinic anhydride as described above, the resultant center portion has ester condensation groups and the terminal portions are acrylamide groups. This is illustrated by the use of the reaction product of 60 parts of succinic anhydride and 24.4 parts of ethylene glycol which has the formula

HOOCCH$_2$CH$_2$CO[OCH$_2$CH$_2$OOCCH$_2$CH$_2$CO]$_2$OH

This product is reacted with the beta-hydroxyethyl acrylamide to give (b′) CH$_2$=CHCONHCH$_2$CH$_2$OOCCH$_2$CH$_2$CO[OCH$_2$
       CH$_2$OOCCH$_2$CH$_2$CO]$_2$OCH$_2$CH$_2$NHOCCH=CH$_2$ (c) Corresponding products are obtained when other alkanolamines are used in place of the ethanolamine, such as butanolamine, octanolamine, hexanolamine, etc., and when other acids or anhydrides and glycols are used in place of the succinic anhydride and ethylene glycol, such as adipic acid, azelaic acid, suberic acid, 1,2-hexahydrophthalic anhydride, etc., and trimethylene glycol, hexamethylene glycol, etc.

EXAMPLE VI

To the reactor of Example I there is added 24 parts of ethylene diamine and 50 parts of succinic anhydride (or 59 parts of succinic acid), and the mixture reacted at 180° C. for six hours or until titration of a sample with 1 N sodium hydroxide shows that it is substantially

HOOC(CH$_2$)$_2$CO[NHCH$_2$CH$_2$NHOC(CH$_2$)$_2$CO]$_4$OH

Then there is added 13.7 parts of ethanolamine and reaction continued an additional two hours to give

HOCH$_2$CH$_2$[NHOC(CH$_2$)$_2$CONHCH$_2$CH$_2$]$_5$OH

Then a Dean-Stark trap is attached to the apparatus for removal of water and there is added 16.2 parts of acrylic acid, 0.5 part of toluene sulfonic acid, 150 parts of toluene, 1 part of hydroquinone, and the mixture refluxed until no more water of condensation is collected in the trap. The mixture is then treated as in Example V–b, and there is isolated the product CH$_2$=CHCOOCH$_2$CH$_2$[NHOC(CH$_2$)$_2$
           CONHCH$_2$CH$_2$]$_5$OOCCH=CH$_2$

EXAMPLE VII

The procedure of Example VI is used except that 54 parts of ethylene diamine and 100 parts of succinic anhydride are used instead of 24 parts and 50 parts respectively, and there is obtained (a′) CH$_2$=CHCOOCH$_2$CH$_2$[NHOC(CH$_2$)$_2$
           CONHCH$_2$CH$_2$]$_9$OOCCH=CH$_2$ In a similar way by using 66 parts of ethylenediamine and 120 parts of succinic anhydride, there is obtained (b′) CH$_2$=CHCOOCH$_2$CH$_2$[NHOC(CH$_2$)$_2$
           CONHCH$_2$CH$_2$]$_{11}$OOCCH=CH$_2$ With 78 parts of ethylenediamine and 140 parts of succinic anhydride there is obtained (c′) CH$_2$=CHCOOCH$_2$CH$_2$[NHOC(CH$_2$)$_2$
           CONHCH$_2$CH$_2$]$_{13}$OOCCH=CH$_2$

EXAMPLE VIII

The procedure of Examples VI and VII are repeated using equivalent quantities of an aromatic dicarboxylic acid, phthalic anhydride, instead of the aliphatic dicarboxylic succinic anhydride, and there is obtanied a series of products of the general formula

CH$_2$=CHCOOCH$_2$CH$_2$[NHOCC$_6$H$_4$CONHCH$_2$CH$_2$]$_n$OOCCH=CH$_2$ $n$=5 in sample $a'$,
$n$=10 in sample $b'$,
$n$=12 in sample $c'$,
$n$=14 in sample $d'$.

EXAMPLE IX

The procedure of Examples VI and VII are repeated using equivalent quantities of an aromatic diamine p-xylylidene diamine, NH$_2$CH$_2$C$_6$H$_4$CH$_2$NH$_2$, instead of the ethylene diamine and there is obtained a series of products of the general formula

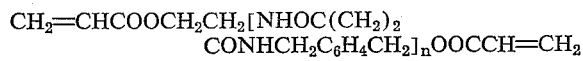
CH$_2$=CHCOOCH$_2$CH$_2$[NHOC(CH$_2$)$_2$CONHCH$_2$C$_6$H$_4$CH$_2$]$_n$OOCCH=CH$_2$ $n$=5 in sample $a'$,
$n$=10 in sample $b'$,
$n$=12 in sample $c'$,
$n$=14 in sample $d'$.

EXAMPLE X

The procedure of Example I is repeated using 60 parts of ethylenediamine and 80 parts of succinic acid anhydride. The ultimate telomerized polyamide has the formula:

(a) 
CH$_2$=CHCONHCH$_2$CH$_2$[NHOCCH$_2$CH$_2$CONHCH$_2$CH$_2$]$_4$NHOCCH=CH$_2$ By varying the proportions of ethylenediamine and succinic acid anhydride telomerized polyamides are obtained in which $n$ has the following values:

(b) $n$=5,
(c) $n$=10,
(d) $n$=12,
(e) $n$=14.

EXAMPLE XI

The procedure of Example X is repeated five times replacing the ethylene diamine with equivalent amounts respectively of tetramethylene diamine. The resultant polyamides have the formula:

CH$_2$=CHCONH(CH$_2$)$_4$[NHOCCH$_2$CH$_2$CONH(CH$_2$)$_4$]$_n$NHOCCH=CH$_2$ wherein (a) $n$=4, (b) $n$=5, (c) $n$=10, (d) $n$=12, (e) $n$=14.

EXAMPLE XII

The procedure of Example X is repeated a number of times with similar results to produce corresponding telomerized polyamides by substituting equivalent amounts of the following diamines for the ethylenediamine:

(a) Trimethylene diamine;
(b) 3,3-diaminobutane;
(c) Hexamethylene diamine;
(d) Decamethylene diamine;
(e) 2,2-diethyl-propanediamine-1,3;
(f) Diethylenetriamine;
(g) 1,4-diaminocyclohexane;
(h) 1,2-diaminocyclohexane; and
(i) 1,4-bis(aminomethyl)cyclohexane.

EXAMPLE XIII

The procedure of Example XII is repeated a number of times with similar results to produce corresponding telomerized polyamides by substituting for the succinic acid anhydride equivalent amounts respectively of the following acids or anhydrides:

(a) Adipic acid;
(b) Glutaric anhydride;
(c) Sebacic acid;
(d) Azelaic acid;
(e) 2-methyl succinic anhydride;
(f) 1,2-hexahydrophthalic anhydride; and
(g) 1,4-hexahydrophthalic acid.

EXAMPLE XIV

The procedures of Examples I–XIII are repeated with similar results to produce the corresponding methacrylic compositions by replacing the acrylic acid or acrylic acid chloride by an equivalent amount of methacrylic acid or methacrylic acid chloride respectively.

EXAMPLE XV

To a reactor equipped with reflux condenser and a means for maintaining a nitrogen atmosphere are added 18 parts of water and 565 parts of caprolactam. The mixture is heated at 150° C. for 12 hours. Then 60 parts of ethylene diamine are added and the reaction continued for 48 hours. The product has the formula:

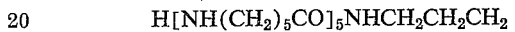
H[NH(CH$_2$)$_5$CO]$_5$NHCH$_2$CH$_2$CH$_2$

To this is added 1600 parts of dimethyl acetamide, 181 parts of acrylyl chloride, 1 part of hydroquinone and 370 parts of t-butylamine. The mixture is heated at 50° C. for four hours to give a solution of the diacryl polyamide having the formula:

CH$_2$=CHCO[NH(CH$_2$)$_5$CO]$_5$NHCH$_2$CH$_2$NHOCCH=CH$_2$ which is isolated by precipitating the solution by addition of 4000 parts of water.

EXAMPLE XVI

To the reactor of Example I equipped with a Dean-Stark trap there is added 159 parts of 8-aminooctanoic acid. This is heated at 200° C. until approximately 18 parts of water has been collected in the trap. Then 12.5 parts of succinic anhydride is added and the reaction continued for one hour. Following this, 15.5 parts of ethylene glycol is added and the reaction continued. At the end of another two hours, 1700 parts of dimethylformamide is added, then 31.5 parts of acrylic anhydride and 1 part of t-butyl catechol are added. Upon continued heating for another one-half hour at 110° C. the following diacrylyl polyamide is obtained (a) 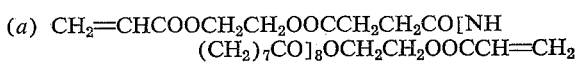
CH$_2$=CHCOOCH$_2$CH$_2$OOCCH$_2$CH$_2$CO[NH(CH$_2$)$_7$CO]$_8$OCH$_2$CH$_2$OOCCH=CH$_2$ The above procedure is repeated except that the succinic anhydride is omitted and 7.5 parts of ethylene diamine is used in place of the ethylene glycol. Then 36 parts of acrylyl anhydride are used instead of acrylic acid to give (b) 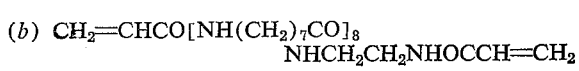
CH$_2$=CHCO[NH(CH$_2$)$_7$CO]$_8$NHCH$_2$CH$_2$NHOCCH=CH$_2$

EXAMPLE XVII

A sample polyamide, I$a$, is heated to 100° C. and poured as a layer one-half inch thick in an aluminum cup and exposed, while open to air, to the beam of a 1 mev. Van de Graaff accelerator. An increase in the viscosity of the sample is observed at 1.1 megarad and at 2.3 megarads the sample becomes completely cross-linked. When an identical sample is exposed to the electron beam of an Arco Mark I microwave linear accelerator operating at a beam energy of 8 mev., the sample also becomes insoluble and infusible at the same dosage, indicating that these telomerized polyamides are dose-rate independent.

However, when the acetyl terminated polyamide of Example I$b$ is irradiated in the same manner and at the same or higher dosages up to 50 megarad, degradation and not crosslinking is observed, which is in accord with the data shown in Report NASA–SP–58, Office of Technical Services, Department of Commerce, Washington, D.C.

EXAMPLE XVIII

The samples of Example VIIIa', b', c' and d' and Example IXa', b', c' and d' are irradiated by the procedure of Example XVII and no evidence of crosslinking is observed at 1, 2, 5, and 10 megarads. Some increase in viscosity is observed at higher dosages than 15 megarads and crosslinking becomes evident at about 26 megarads for the samples of Example XVIII and at about 23 megarads for the samples of Example IX. These show the effect of the aromatic nuclei on the radiation dose required.

EXAMPLE XIX

The procedure of Example XVII is repeated twenty times using respectively the samples of Example IIa', b', c', d', e', f', g', h', i', and j'; Example IIIa', b', c', d', e', and f'; Example XV, and Example XVIa and b. All samples crosslink between 1.75–2.55 megarads. The products vary from hard to rubbery masses depending on the length of alkylene groups.

EXAMPLE XX

The procedure of Example XVII is repeated five times with samples of Example IVa', b', c', d', and e', and all of them crosslink with radiation doses in the range of 1.90 to 2.58 megarads. The products vary from hard to ductile masses depending on the length and nature of the carbon chains, the longer and more branched the chain the more ductile is the final product.

EXAMPLE XXI

All of the telomerized polyamides of Examples V–VII and X–XIV, inclusive, are irradiated by the procedure of Example XVII, and all crosslink at irradiation doses of less than 4.0 megarads.

EXAMPLE XXII

The telomerized polyamides of Examples VII are cast into glass vials by first heating them to a melt and then allowing them to cool to room temperature and exposed to the ionizing radiation beam of a 0.450 mev. electron accelerator. All of them become insoluble and infusible at the following dosages:

Sample VIIa', $n=10$, 4.2 megarads
Sample VIIb', $n=12$, 4.6 megarads
Sample VIIc', $n=15$, 5.2 megarads This data indicates that, a value of $n$ of 15 or less represents an economical upper limit for these telomerized polyamides. This value of no more than 14 can be obtained as an average value such as for example, by mixing equal portions by weight the sample of Example VI, in which $n=5$ and the sample of Example VIIc' in which $n=14$. Such a mixture crosslinks at a dosage of 4.2 megrad.

When a mixture of nine parts of the polymer of Example IIa' and one part of the polymer of Example VIIc' are mixed, irradiation crosslinking is observed at 3.1 megarads.

EXAMPLE XXIII

Ninety parts of powdered nylon 66 and 10 parts of telomerized polyamide Ia are thoroughly and uniformly mixed and then melt extruded into a thin sheet. This sheet is subjected to ionizing radiation. A tough product of improved softening point is produced at 3.5 megarads. Exposure to a dose of 8 megarads produces only a slightly harder product.

To improve the heat resistance further the foregoing procedure is modified using a higher ratio of telomerized polyamide to the nylon 66 as follows:

|  | Parts |
| --- | --- |
| Nylon 66 | 80 |
| Telomerized polyamide | 20 | and

| | |
| --- | --- |
| Nylon 66 | 77 |
| Telomerized polyamide | 25 |

Compositions of the kind illustrated in this example have the advantage that they do not contain radical initiators and can be stored for long periods of time, and still are readily cured without the addition of catalyst by the simple expedient of subjecting them to irradiation. The foregoing procedure is repeated with excellent results using as the diacrylpolyamide one having the formula

in which $n=8$, and also with the diacrylpolyamides of Examples XV and XVI.

EXAMPLE XXIV

The procedure of Example XXIII is repeated except that instead of nylon 66, there is used polycaprolactamide and infusibility and insolubility is obtained at 3–4 megarads of irradiation.

In contrast, when the aromatic containing telomerized polyamides of Examples VIII and IX and the acetyl telomerized polyamide of Example Ib are used in Examples XXI and XXII irradiation doses in excess of 18 megarads are required to produce hard infusible polymers.

It will be understood of course that this invention is not limited to the interpolymerization of nylon and polycaprolactamide with the telomerized polyamide of Example Ia and that the other acrylyl telomerized polyamides alone or in combination can be used, for example, the telomerized polyamides of Examples II, VII and X–XIV give similar results. Moreover, other methods of combining or mixing the polyamide and the diacrylpolyamide can be used. For example the polyamide and the diacrylpolyamide can be dissolved in a mutual solvent, such as dimethylformamide, and films laid therefrom which can be subsequently radiated.

EXAMPLE XXV

|  | Parts |
| --- | --- |
| Alkyd resin A | 80 |
| Telomerized polyamide, Example Ia | 20 |

The alkyd resin A and the telomerized polyamide are thoroughly and uniformly mixed as a melt before being subjected to ionizing radiation and converted to an insoluble, infusible hard product at a dose of 3.6 megarads. Exposure to a dose of 8 megarads produces only a slightly harder product.

Fillers such as wood flour, alpha cellulose, shredded cellulose derivatives, asbestos, paper, cloth, sand, silica, calcium sulfate, etc. can be coated or impregnated with the mixture and the mass hardened by irradiation to produce formed articles of good appearance and excellent physical properties and improved heat resistance.

To improve the heat resistance further the foregoing procedure is modified using a higher ratio of telomerized polyester to the unsaturated alkyd as follows:

|  | Parts |
| --- | --- |
| Alkyd resin A | 50 |
| Telomerized polyamide | 50 | and

|  |  |
| --- | --- |
| Alkyd resin A | 75 |
| Telomerized polyamide | 25 |

Compositions of the kind illustrated in this example have the advantage that they do not contain radical initiators and can be stored for long periods of time, and still are readily cured without the addition of catalyst by the simple expedient of subjecting them to irradiation.

EXAMPLE XXVI

The procedure of Example XXV is repeated except that instead of alkyd resin A, there is used alkyd resin B and infusibility and insolubility is obtained at 3–4 megarads of irradiation.

The compositions of Examples XXV and XXVI can be used as room temperature, low pressure laminating resins for the preparation of reinforced laminates from glass mats or fabrics.

It will be understood of course that this invention is not limited to the interpolymerization of alkyd resins A and B with the telomerized polyamide of Example I*a* and that the other acrylyl telomerized polyamides alone or in combination can be used, for example, the telomerized polyamides of Examples II–VII and X–XIV give similar results.

In contrast, when the aromatic containing telomerized polyamides of Examples VIII and IX and the acetyl telomerized polyamide of Example I*b* are used in the Examples XXV and XXVI, irradiation doses in excess of 18 megarads are required to produce hard infusible polymers.

Similarly, high irradiation doses in excess of 16 megarads are required with the aromatic containing alkyd resin J is used with the acrylyl telomerized polyamides in contrast to the use of alkyd resins C, D, E, F, H and I which become infusible and insoluble in the range of 3.6 to 4.1 megarads.

The use of unsaturated alkyd resin G, which is an acrylyl terminated unsaturated alkyd in admixture with the acrylyl telomerized aliphatic type polyamides, for example, the polyamides of Examples I, II and III, is particularly beneficial since in all cases crosslinking occurs within the range of 1.9 to 2.2 megarads.

EXAMPLE XXVII

A smoothly sanded pineboard 12 inches by 36 inches and ⅝-inch thick is coated on one surface with a mixture of equal parts of the polyamide of Example II*a'* and Example X*a* to produce a layer of polyamide 0.005-inch in thickness, and the board is progressed under the sweeping beam of the linear accelerator to be given a uniform dose of 3 megarads. The finished board has the appearance of a high gloss varnished lumber.

When the above polyamide mixture is blended and milled with 60 parts of titanium dioxide pigment (paint grade) and the pigmented polyamide applied to wood, fiber board or concrete block, a porcelainized finish is obtained when the coating is irradiated.

EXAMPLE XXVIII

Fifty parts of the telomerized polyamide of Example I*a* is diluted with 10 parts of ethylene dimethacrylamide and a concrete panel ⅛-inch thick is impregnated with this solution and the panel irradiated to a dosage of 3.5 megarads; a water-impervious panel is obtained.

EXAMPLE XXIX

A mixture of 80 parts of exploded wood fibers of the type used to prepare fiber board, 12 parts of the telomerized polyamide of Example X*b*, 1 part of zinc stearate and seven parts of linseed oil are milled to uniformity, pressed into a board and given 4.8 megarads of irradiation. There is obtained a well knit, hard board which is readily paintable with either solvent type paints, or aqueous emulsion paints.

EXAMPLE XXX

Four parts of the polyamide of Example X*b* are added to 10 parts of water containing 0.5% of sodium dioctyl sulfosuccinate as an emulsifying agent and the mixture emulsified in a colloidal mill. The emulsion of the telomerized polyamide is added to 50 parts of prepuffed polystyrene beads mixed and the mixture tumbled until all the beads are uniformly coated. The water is then allowed to evaporate from the coated foamed beads which adhere slightly to each other. The coated foamed beads are then placed in a container such as a cardboard box and irradiated to a dose of about 4 megarads. By this process there is obtained a foamed structure in which the beads are all bonded with infusible bonds to each other, the shape of which conforms to the form of the container.

EXAMPLE XXXI

A uniform mixture of 40 parts of the diacrylyl polyamide of Example I and 60 parts of a plastisol grade of polyvinylchloride having a molecular weight of about 25,000 is prepared. This is melt extruded into pipe and given an irradiation dose of 3 megarads. The polyvinylchloride is not degraded by this small dosage and the treatment makes the pipe insoluble and infusible so that it withstands hot water 210° F. and hot saturated brine at 215° F. without softening. It also withstands hot solutions of acetic acid, toluene, carbon tetrachloride, etc.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. The highly radiation-sensitive telomerized diacrylyl polyamide and having a formula selected from the class consisting of

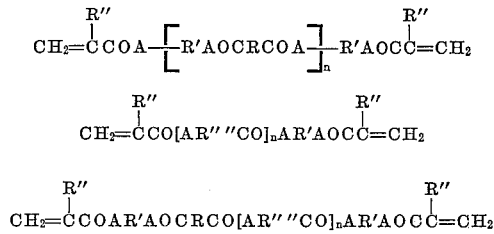

and wherein:
- A represents a divalent radical selected from the class consisting of —O— and —NH— wherein at least one A radical represents —NH—;
- R represents a connecting linkage between the two adjacent carboxylic radicals selected from the class consisting of a single valence bond and a divalent saturated aliphatic hydrocarbon radical having no more than 10 carbon atoms;
- R' represents a saturated divalent aliphatic hydrocarbon radical having 2–10 carbon atoms;
- R'' is selected from the class consisting of hydrogen and methyl;
- R'''' represents a saturated divalent hydrocarbon radical having 4–10 carbon atoms; and
- $n$ is an integer having a value of 1–14.

2. The telomerized diacrylyl polyamide of claim 1, which has the formula

3. The telomerized diacrylyl polyamide of claim 1, which has the formula

4. The telomerized diacrylyl polyamide of claim 1, which has the formula

5. The telomerized diacrylyl polyamide of claim 1, which has the formula

6. A process for producing an improved polyamide resin composition comprising the treatment of a highly 3,470,079

23 radiation-sensitive telomerized diacrylyl polyamide having a formula selected from the class consisting of

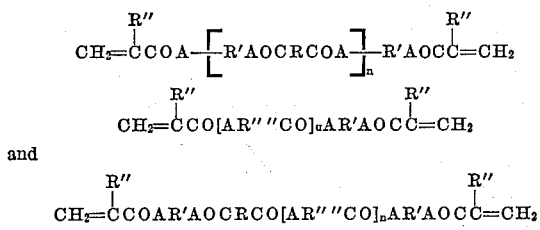

and wherein:
A represents a divalent radical selected from the class consisting of —O— and —NH— wherein at least one A radical represents —NH—;
R represents a connecting linkage between the two adjacent carboxylic radicals selected from the class consisting of a single valence bond and a divalent saturated aliphatic hydrocarbon radical having no more than 10 carbon atoms;
R' represents a saturated divalent aliphatic hydrocarbon radical having 2–10 carbon atoms;
R'' is selected from the class consisting of hydrogen and methyl;
R'''' represents a saturated divalent aliphatic hydrocarbon radical having 4–10 carbon atoms; and
$n$ is an integer having a value of 1–14;
with at least about 0.5 megarad and no more than about 8 megarads of high energy, ionizing radiation equivalent to at least 100,000-electron volts.

7. The process of claim 6 in which said diacrylyl polyamide is intimately admixed with a copolymerizable monomer, said diacrylyl polyamide comprising 1–99 percent by weight of the resultant mixture and said copolymerizable monomer comprising 99–1 percent by weight of the resultant mixture.

8. The process of claim 6 in which said diacrylyl polyamide is in intimate admixture with a polyamide resin consisting essentially of a plurality of repeating units having a formula selected from the class consisting of —R''''CONH— and —R''''NHOCR''''CONH—, wherein R'''' is a divalent saturated aliphatic hydrocarbon radical of 4–10 carbon atoms having at least 4 carbon atoms in the linear chain between the two valencies thereof and having a molecular weight of at least 500, said polyamide resin comprising 10–70 percent by weight of the resultant mixture and said diacrylyl diamide comprising 30–90 percent by weight of the resultant mixture.

9. The process of claim 6 in which said diacrylyl polyamide is in intimate admixture with an unsaturated aliphatic alkyd resin, said diacrylyl polyamide comprising 10–70 percent by weight of the resultant mixture and said unsaturated aliphatic alkyd resin comprising 30–90 percent by weight of the resultant mixture.

10. The process of claim 6 in which said diacrylyl polyamide has the formula $CH_2=CHCONHCH_2CH_2NHOCCH_2$
$CH_2CONHCH_2CH_2NHOCCH=CH_2$ 11. The process of claim 6 in which said diacrylyl polyamide has the formula $CH_2=CHCONHCH_2CH_2NHOC(CH_2)_4$
$CONHCH_2CH_2NHOCCH=CH_2$ 12. The process of claim 6 in which said diacrylyl polyamide has the formula

24

13. The process of claim 6 in which said diacrylyl polyamide has the formula

14. The process of claim 6 in which said diacrylyl polyamide has the formula

15. A radiated polymeric product produced according to the process of claim 6.
16. A radiated polymeric product produced according to the process of claim 7.
17. A radiated polymeric product produced according to the process of claim 8.
18. A radiated polymeric product produced according to the process of claim 9.
19. A radiated polymeric product produced according to the process of claim 10.
20. A radiated polymeric product produced according to the process of claim 11.
21. A radiated polymeric product produced according to the process of claim 12.
22. A radiated polymeric product produced according to the process of claim 13.
23. A radiated polymeric product produced according to the process of claim 14.
24. A process for producing an improved polyamide resin composition comprising the treatment of a highly radiation-sensitive telomerized diacrylyl polyamide having a formula selected from the class consisting of:

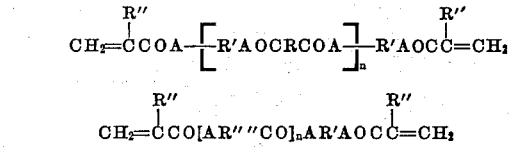

and

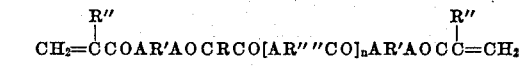

wherein:
A represents a divalent radical selected from the class consisting of —O— and —N— wherein at least one A radical represents —NH—;
R represents a connecting linkage between the two adjacent carboxylic radicals selected from the class consisting of a single valence bond and a divalent saturated aliphatic hydrocarbon radical having no more than 10 carbon atoms;
R' represents a saturated divalent aliphatic hydrocarbon radical having 2–10 carbon atoms;
R'' is selected from the class consisting of hydrogen and methyl;
R'''' represents a saturated divalent aliphatic hydrocarbon radical having 4–10 carbon atoms; and
$n$ is an integer having a value of 1–14;
with at least about 0.5 megarad of high energy, ionizing radiation equivalent to at least 100,000 electron volts.

References Cited
UNITED STATES PATENTS 2,333,923  11/1943  Gray _____ 260—76
2,251,946   8/1941  Lott _____ 260—561

MURRAY TILLMAN, Primary Examiner
RICHARD B. TURNER, Assistant Examiner

U.S. Cl. X.R.

117—123, 148, 161; 161—197; 204—159.19, 159.22; 260—17.4, 40, 41, 75, 78, 485, 557, 561, 857

PO-1050
(5/69)

UNITED STATES PATENT OFFICE
CERTIFICATE OF CORRECTION

Patent No. __3,470,079__    Dated __September 30, 1969__

Inventor(s) __Gaetano F. D'Alelio__

It is certified that error appears in the above-identified patent and that said Letters Patent are hereby corrected as shown below:

Column 1, line 5

"Pittsburgh, Pa." should be inserted after "PPG INDUSTRIES, INC."

Column 4, line 35

1(a)
2 $CH_2=CHCOC_1$ should be --2 $CH_2=CHCOCl$--

Column 4, line 73

1(d)
2 $CH_2=CHCOC_1$ should be --2 $CH_2=CHCOCl$--

Column 5, line 12

1(e)
2 $CH_2=CHCOC_1$ should be $CH_2=CHCOCl$

Column 5, line 19

1(f)
$CH_2=CHCOC_1$ should be $CH_2=CHCOCl$

Column 8, line 34     Column 8, line 65
"coonist" should be --consist-- ; "be" should be eliminated Column 10, line 22

"instane" should be --instance--

Column 12, line 29
"viny" should be --vinyl--

PO-1050
(5/69)

UNITED STATES PATENT OFFICE
CERTIFICATE OF CORRECTION

Page 2

Patent No. 3,470,079   Dated September 30, 1969

Inventor(s)   Gaetano F. D'Alelio

It is certified that error appears in the above-identified patent and that said Letters Patent are hereby corrected as shown below:

Column 13, line 47

"methvinyl" should be --methylvinyl--

Column 18, line 61

"Van de Graaff" should be --Van der Graaff--

Column 21, line 16

"with" should be --when--

Column 23, line 10

"$_u$AR'AOCC" should be --$_n$AR'AOCC--

SIGNED AND
SEALED
JUL 14 1970

(SEAL)
Attest:

Edward M. Fletcher, Jr.
Attesting Officer

WILLIAM E. SCHUYLER, JR.
Commissioner of Patents